US008719299B2

(12) United States Patent
Voigt et al.

(10) Patent No.: US 8,719,299 B2
(45) Date of Patent: May 6, 2014

(54) SYSTEMS AND METHODS FOR EXTRACTION OF CONCEPTS FOR REUSE-BASED SCHEMA MATCHING

(75) Inventors: Konrad Voigt, Dresden (DE); Peter Mucha, Dresden (DE)

(73) Assignee: SAP AG, Walldorf (DE)

( * ) Notice: Subject to any disclaimer, the term of this patent is extended or adjusted under 35 U.S.C. 154(b) by 237 days.

(21) Appl. No.: 13/310,483

(22) Filed: Dec. 2, 2011

(65) Prior Publication Data
US 2013/0144893 A1    Jun. 6, 2013

(51) Int. Cl.
*G06F 17/30*    (2006.01)
(52) U.S. Cl.
USPC ............................ 707/776; 707/790; 707/798
(58) Field of Classification Search
USPC .......................... 707/739, 756, 760, 798, 776
See application file for complete search history.

(56) References Cited

U.S. PATENT DOCUMENTS

| | | | | |
|---|---|---|---|---|
| 5,806,062 A * | 9/1998 | Chen et al. ............................ | 1/1 |
| 5,970,490 A * | 10/1999 | Morgenstern ........................ | 1/1 |
| 6,789,088 B1 * | 9/2004 | Lee et al. ....................... | 707/741 |
| 6,993,745 B1 * | 1/2006 | Ballantyne et al. ........... | 717/109 |
| 7,444,293 B1 * | 10/2008 | Kahn et al. ......................... | 705/3 |
| 8,392,398 B2 * | 3/2013 | Aggarwal et al. ............. | 707/713 |
| 8,396,884 B2 * | 3/2013 | Singh et al. .................... | 707/760 |
| 8,429,179 B1 * | 4/2013 | Mirhaji .......................... | 707/756 |
| 8,433,715 B1 * | 4/2013 | Mirhaji .......................... | 707/756 |
| 2002/0187770 A1 * | 12/2002 | Grover et al. ................. | 455/403 |
| 2003/0065669 A1 * | 4/2003 | Kahn et al. .................... | 707/100 |
| 2004/0239674 A1 * | 12/2004 | Ewald et al. .................. | 345/440 |
| 2006/0036564 A1 * | 2/2006 | Yan et al. ........................... | 707/1 |
| 2007/0239694 A1 * | 10/2007 | Singh et al. ....................... | 707/3 |
| 2008/0155520 A1 * | 6/2008 | Meloche et al. ............... | 717/157 |
| 2009/0043797 A1 * | 2/2009 | Dorie et al. .................... | 707/101 |
| 2009/0177777 A1 * | 7/2009 | Behrendt et al. .............. | 709/226 |
| 2009/0316988 A1 * | 12/2009 | Xu et al. ........................ | 382/173 |
| 2010/0332540 A1 * | 12/2010 | Moerchen et al. ............ | 707/776 |
| 2011/0078143 A1 * | 3/2011 | Aggarwal ...................... | 707/737 |
| 2011/0173189 A1 * | 7/2011 | Singh et al. ................... | 707/722 |
| 2011/0182479 A1 * | 7/2011 | Sese et al. ..................... | 382/113 |
| 2011/0313932 A1 * | 12/2011 | Bhandar et al. ............... | 705/301 |
| 2013/0097138 A1 * | 4/2013 | Barkol et al. ................. | 707/706 |

OTHER PUBLICATIONS

Yubao Liu and Yucai Feng, "Interactive Mining of Schema for Semistructured Data," Proc. SPIE 4730, Data Mining and Knowledge Discovery: Theory, Tools, and Technology IV, Mar. 13, 2002, pp. 432-441, Orlando, Florida.

Barna Saha et al., "Schema Covering: A Step Towards Enabling Reuse in Information Integration," Data Engineering (ICDE), 2010 IEEE 26th International Conference on IEEE, Mar. 1, 2010, pp. 285-296.

(Continued)

*Primary Examiner* — Hanh Thai
(74) *Attorney, Agent, or Firm* — Fountainhead Law Group PC

(57) ABSTRACT

In one embodiment, an approach to automated recurring concept extraction, from a plurality of input data models (schemas) is presented. The approach converts input data models to graphs, with typed elements. The graphs are mined for closed subgraphs that have a defined minimum support. The identified subgraphs can be filtered with a relevance metric. These subgraphs are converted to schemas or an appropriate representation, and stored for reuse in a repository. The repository can be used to automate further transformation or mapping of schemas presented to a system that uses the repository. In one example, the repository is used in a schema covering process to perform schema transformation.

17 Claims, 5 Drawing Sheets

(56) References Cited

OTHER PUBLICATIONS

Ke Wang, Yu He, and Jiawei Han, "Mining Frequent Itemsets Using Support Constraints," Proceedings of the 26 VLDB Conference on Very Large Data Bases, Sep. 10, 2000, pp. 43-52.

Erhard Rahm et al., "Matching Large XML Schemas," SIGMOD RECORD, vol. 33, No. 44, Dec. 4, 2004, pp. 26-31.

Do et al., "Matching Large Schemas: Approaches and Evaluation," Information Systems, Pergamon Press, Oxford, GB., vol. 32, No. 6, May 5, 2007, pp. 857-885.

H. Do, et al., "COMA—A System for Flexible Combination of Schema Matching Approaches," in VLDB '02, Proceedings of the 28th International Conference on Very Large Databases, Jan. 1, 2002.

Xifeng Yan and Jiawegi Han, "CloseGraph: Mining Closed Frequent Graph Patterns," SIGKDD '03, Aug. 24-27, 2003.

Extended European Search Report, mailed Jul. 1, 2013, (from a corresponding foreign application), EP 12008014.8.

Yan, X. a. (2003). CloseGraph: mining closed frequent graph patterns. Proc. of international conference on Knowledge discovery and data mining.

Yan, X. a. (2002). gSpan: graph-based substructure pattern mining. Proc. of International Conference on Data Mining.

Saha, B. a. (2010). Schema covering: a step towards enabling reuse in information integration. Proc. of Data Engineering (ICDE), (pp. 285-296).

Antoniol, G. a. (1998). Using metrics to identify design patterns in object-oriented software. Proc. of Fifth International Symposium on Software Metrics (METRICS'98). IEEE.

Do, H.-H. a. (2007). Matching large schemas: Approaches and evaluation. Information Systems.

Ritze, D. a.-Z. (2010). A pattern-based ontology matching approach for detecting complex correspondences. Proc. of OM workshop at ISWC.

Saigo, H. a. (2009). gBoost: a mathematical programming approach to graph classification and regression. Machine learning , 69-89.

Stuhec, G. a. (2007). Accelerate Your Business Data Modeling and Integration Issues by CCTS Modeler Warp 10. Retrieved from http://www.sdn.sap.com/irj/scn/index?rid=/library/uuid/00435406-4b7e-2a10-b28a-b7143af53e88.

Jermaine, C. (1999). Computing program modularizations using the k-cut method. Proc. of 6th Reverse Engineering (pp. 223-234). IEEE.

Gamma, E. a. (1995). Design patterns: elements of reusable object-oriented software. Addison-wesley Reading, MA.

\* cited by examiner

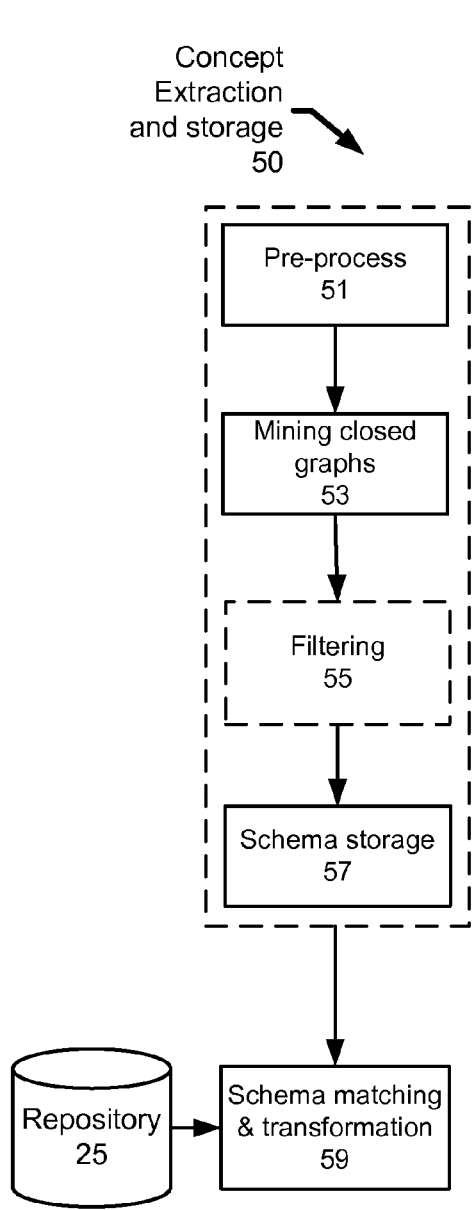
FIG. 2
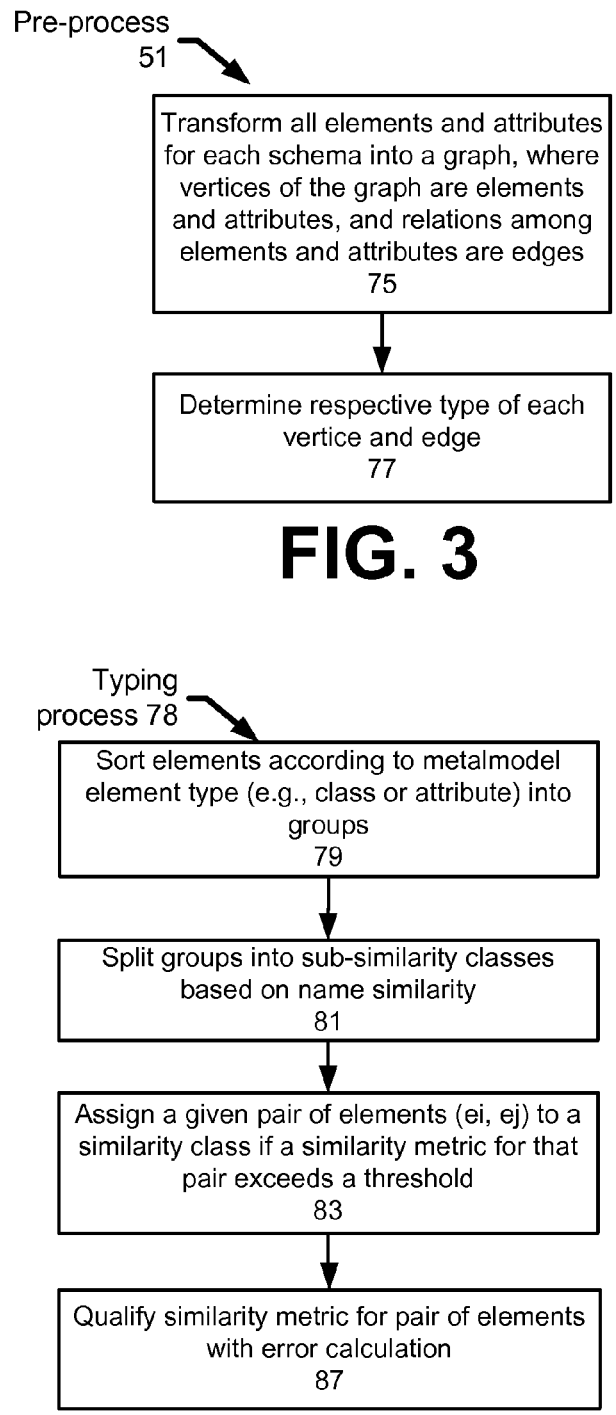
FIG. 3
FIG. 4

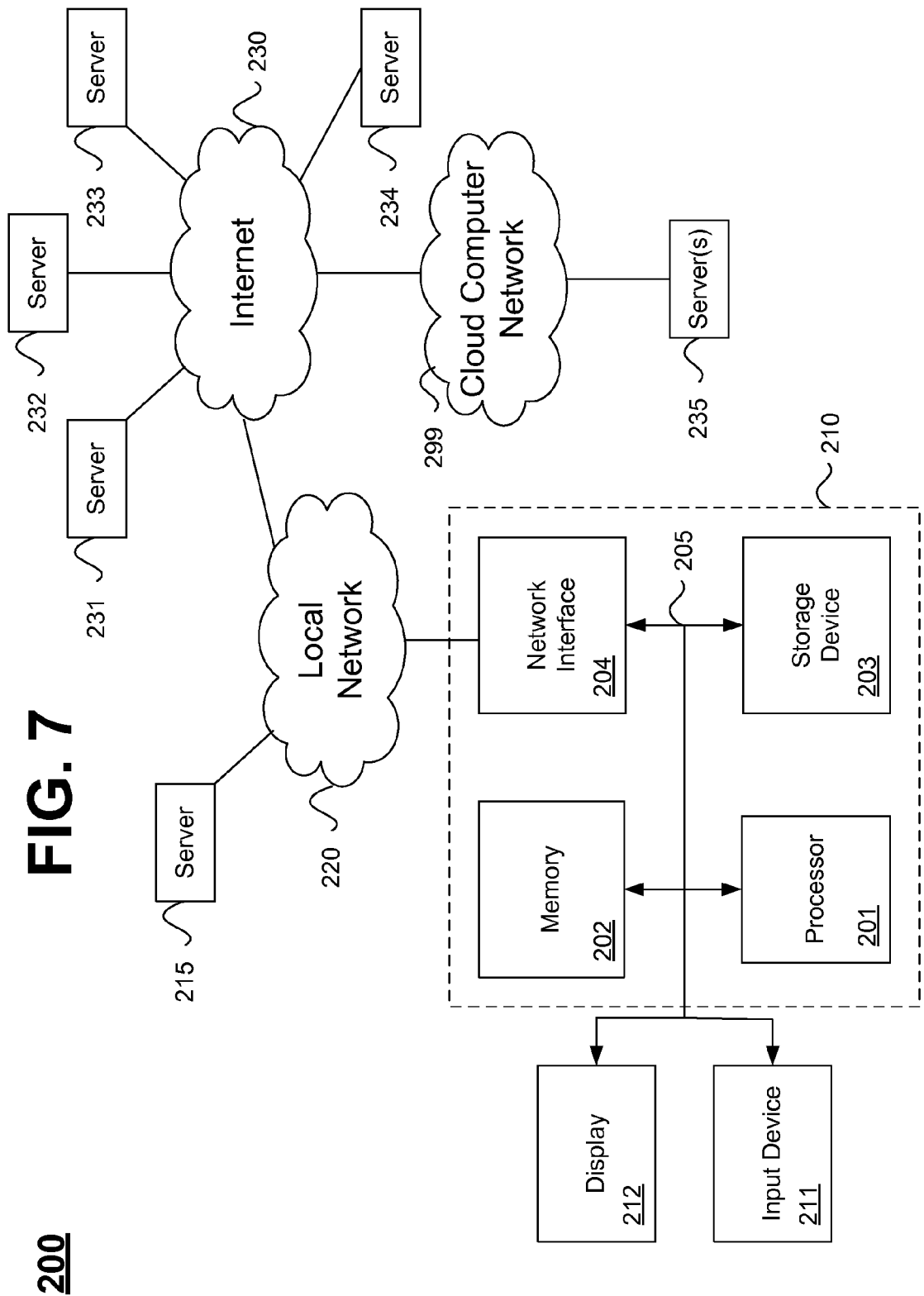

SYSTEMS AND METHODS FOR EXTRACTION OF CONCEPTS FOR REUSE-BASED SCHEMA MATCHING

BACKGROUND

The present invention relates to data integration. In one aspect, data integration can be viewed as taking a dataset specified according to one format, and combining it with data that has a different format, while still preserving the meaning of the data. For example, in one dataset, a date of birth may be specified by separate fields for a month, day and year of birth. In another dataset, the date of birth may simply be specified by a single date field. In the datasets, there may be relations to an object class to which the date of birth applies. That object class may in turn have relations to still other classes. For example, a dataset could comprise all the information concerning an account profile and trading history for a number of clients in a brokerage firm. Such account profile would include various biographical information, and a potentially large amount of data on stock trades, which may have been stored in a relational database specific to that brokerage. If one would want to convert that data to a different format, such as to integrate two brokerages, conventionally, a database integrator would determine an appropriate mapping between the formats of the datasets and then have a machine perform the translations.

However, the above is an example of a relatively confined problem statement, with a specific and non-reoccurring business need to translate a relatively defined set of data (i.e., the amount of data may be large, but the nature and the contents of the dataset are well-specified). There are many other areas where these circumstances do not necessarily exist. As such, there is continued interest in research related to these kinds of problems.

SUMMARY

Embodiments of the present invention include a machine implemented method of generating data describing concepts from data describing schema, comprises accepting data describing a plurality of schema, deriving a respective graph representation of each schema in the plurality of schema to form data describing a set of graphs, mining the set of graphs to determine a set of closed subgraphs that appear frequently in the set of graphs, converting at least some of the subgraphs to respective schema representations, and storing data representing the schemas created from the converted subgraphs on a tangible computer readable medium.

In one embodiment, the present invention further comprises setting a minimum support threshold used to determine whether a given closed subgraph is frequently appearing or not.

In one embodiment, the mining of the set of subgraphs comprises initially identifying a pattern occurring in multiple graphs of the set of graphs and repeatedly enlarging the pattern by adding edges found in to the pattern to make the pattern larger until a number of graphs in the plurality of graphs that would remain after adding another component to the pattern falls below a threshold.

In one embodiment, the present invention further comprises assigning a similarity class to each element of the set of graphs and using the similarity class in the mining of the set of graphs to perform lexically inexact pattern matching during the mining.

In one embodiment, the similarity class of each vertex is determined according to a type of data represented by the vertex, and a pairwise comparison of name similarity of the vertexes in the similarity class, wherein the pairwise comparison the name similarity is conditioned on the similarity being greater than a threshold.

In one embodiment, the present invention further comprises filtering the set of subgraphs resulting from the mining according to a relevancy metric calculated for each of the subgraphs of the set, the relevancy metric determined by a formula according to relevance $=|p|^{\alpha} \cdot |f|^{\beta}$, where $|p|$ is a size of that subgraph, and $|f|$ is a frequency of appearance of that subgraph in the set of graphs, where $\alpha$ and $\beta$ are selected to determine a relative priority of frequency of appearance and size of subgraphs.

In one embodiment, the present invention further comprises receiving a source schema and a target schema, and performing schema covering on the source schema and the target schema, using the stored schemas converted from the subgraphs.

Embodiments of the present invention include a system for generating data describing concepts from data describing schema, comprising a processor capable of being configured using machine readable instructions, a tangible machine readable medium, operatively coupled to the processor, and on which is stored instructions for configuring the processor, the instructions for causing the processor to perform a method comprising accepting data describing a plurality of schema, deriving a respective graph representation of each schema in the plurality of schema to form data describing a set of graphs, mining the set of graphs to determine a set of closed subgraphs that appear frequently in the set of graphs, and converting at least some of the subgraphs to respective schema representations and storing data representing the schemas created from the converted subgraphs on a tangible computer readable medium.

In one embodiment, the instructions stored on the machine readable medium further comprise instructions for setting a minimum support threshold used to determine whether a given closed subgraph is frequently appearing or not.

In one embodiment, the mining of the set of subgraphs comprises initially identifying a pattern occurring in multiple graphs of the set of graphs and repeatedly enlarging the pattern by adding edges found in to the pattern to make the pattern larger until a number of graphs in the plurality of graphs that would remain after adding another component to the pattern falls below a threshold.

In one embodiment, the deriving of the respective graph representations further comprises determining a respective type and a respective similarity class for each vertice of the graph representations, and using the type and similarity class during mining of the set of graphs.

In one embodiment, the similarity class of each vertex is determined according to a type of data represented by the vertex and a pairwise comparison of name similarity of the vertexes in the similarity class, the pairwise comparison the name similarity conditioned on the similarity being greater than a threshold.

In one embodiment, the present invention further comprises filtering the set of subgraphs resulting from the mining according to a relevancy metric calculated for each of the subgraphs of the set.

In one embodiment, the relevancy metric comprises calculating the relevancy of each subgraph by a formula according to relevance $=|p|^{\alpha} \cdot |f|^{\beta}$, where $|p|$ is a size of each subgraph, and $|f|$ is a frequency of appearance of that subgraph in the set of graphs, where $\alpha$ and $\beta$ are selected to determine a relative priority of frequency of appearance and size of subgraph.

Embodiments of the present invention include a tangible machine readable memory storing machine readable instructions for configuring a machine to perform a method comprising accepting data describing a plurality of schema, deriving a respective graph representation of each schema in the plurality of schema to form data describing a set of graphs, mining the set of graphs to determine a set of closed subgraphs that appear frequently in the set of graphs, converting at least some of the subgraphs to respective schema representations, and storing data representing the schemas created from the converted subgraphs on a tangible computer readable medium.

In one embodiment, the present invention further comprises setting a minimum support threshold used to determine whether a given closed subgraph is frequently appearing or not.

In one embodiment, the mining of the set of subgraphs comprises initially identifying a pattern occurring in multiple graphs of the set of graphs and repeatedly enlarging the pattern by adding edges found in to the pattern to make the pattern larger until a number of graphs in the plurality of graphs that would remain after adding another component to the pattern falls below a threshold.

In one embodiment, the present invention further comprises assigning a similarity class to each element of the set of graphs and using the similarity class in the mining of the set of graphs to perform lexically inexact pattern matching during the mining.

In one embodiment, the similarity class of each vertex is determined according to a type of data represented by the vertex, and a pairwise comparison of name similarity of the vertexes in the similarity class, wherein the pairwise comparison the name similarity is conditioned on the similarity being greater than a threshold.

In one embodiment, the present invention further comprises filtering the set of subgraphs resulting from the mining according to a relevancy metric calculated for each of the subgraphs of the set, the relevancy metric determined by a formula according to relevance $=|p|^{\alpha} \cdot |f|^{\beta}$, where $|p|$ is a size of that subgraph, and $|f|$ is a frequency of appearance of that subgraph in the set of graphs, where $\alpha$ and $\beta$ are selected to determine a relative priority of frequency of appearance and size of subgraphs.

The following detailed description and accompanying drawings provide a better understanding of the nature and advantages of the present invention.

BRIEF DESCRIPTION OF THE DRAWINGS

FIG. 2 depicts an overview of a process for concept extraction and reuse for schema matching and transformation;

FIG. 3 depicts a process used in converting a schema to a graph representation in preparation for concept extraction;

FIG. 4 depicts an example of typing elements of a graph representation for a particular schema being converted;

FIG. 7 depicts an example system environment in which disclosed aspects can be practiced.

DETAILED DESCRIPTION

Figure 1:
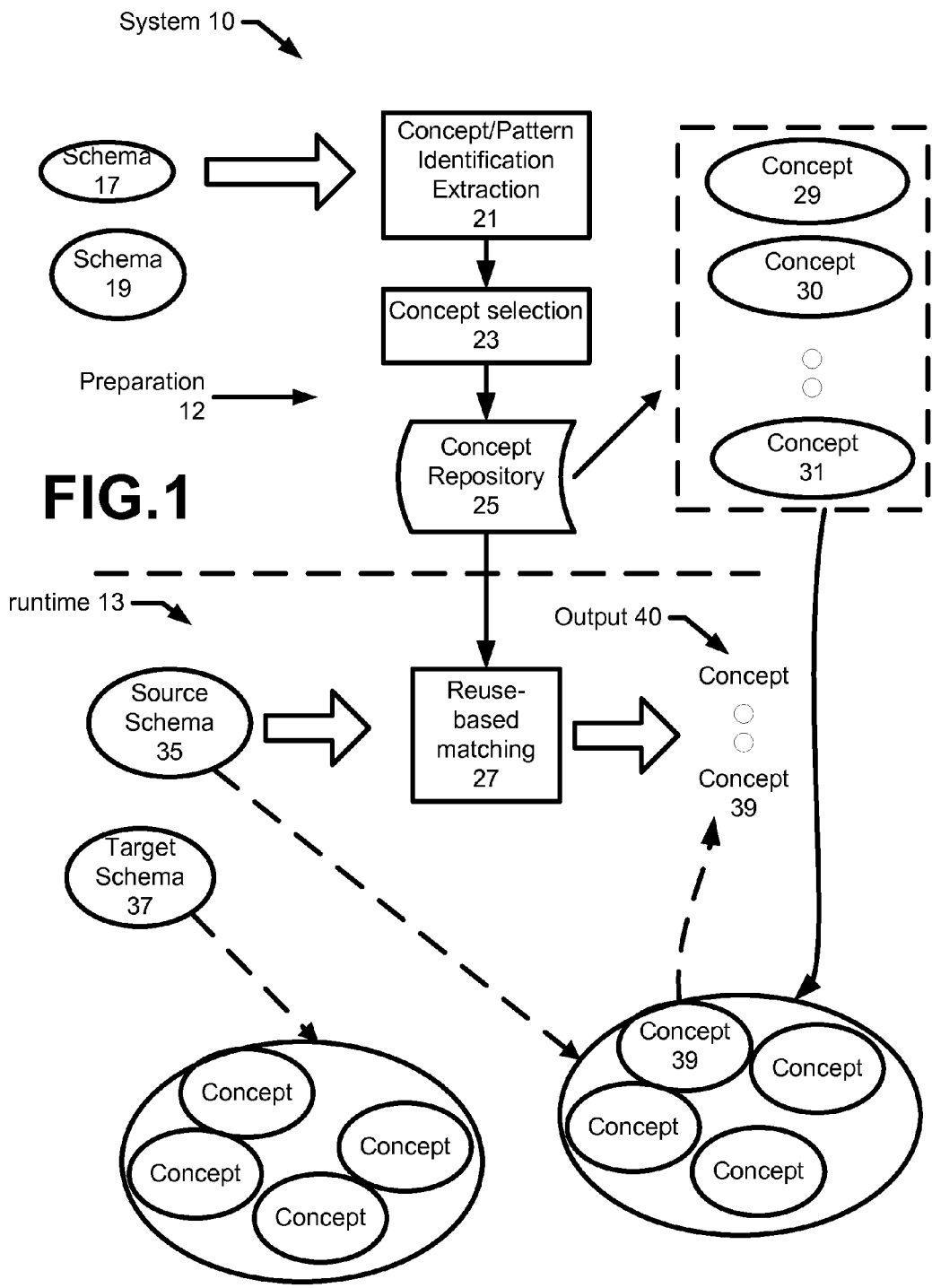
FIG. 1 depicts a modular system architecture in which concept extraction and population of a concept repository for reuse matching can be used.

Described herein are techniques for automatically creating a repository of concepts (can be stored as a data schema, for example) from a set of input schemas or data models. These concepts are then used as a repository of concepts (meta models) that can be used in identifying concepts in new schemas.

In context, a variety of approaches have been proposed that go towards determining a mapping from an original data model to a target data model. As introduced above, where the problem is relatively specific, a manual approach to creating mappings may be appropriate.

Indeed using a repository of design patterns in a matching system has been proposed, but the repository has been manually created, of limited size, and either populated to address a narrow toy problem, or were populated with a set of well-known design patterns.

Other approaches have attempted to automate matching of elements from a source data model to a target data model. A repository approach of creating mappings among elements in data models also has been explored. For example, considering the date of birth example, a data element in one model is the field expressing the entirety of a birth date, and a repository may contain a mapping between that data element and individual data fields. With respect to eXtensible Markup Language (XML), semi-automatic schema matching has become more commonplace, and is generally referred to as database schema integration. Complementary work exists in ontology matching. In these endeavors, a usual matching system receives two schemas, ontologies or meta-models as input and creates mappings or transformations as output.

No existing approach automates recognition of design patterns as concepts and uses such concepts for reuse-based model matching. Practical applications of the subject matter of the disclosure range from ontology matching, data reuse and integration, data mining, decision analytics, and so on.

These disclosures thus relate to an automated approach that derives a repository of concepts from a training set that has multiple inputs, such as multiple data models, process descriptions, schemas, or the like. By using a broader base of inputs, recognition of relevant and reoccurring concepts is provided, such that these concepts can be used as a basis for mapping or transforming other data models, using the repository of concepts created from the training set. As such, the concept repository stores data representing concepts found to be reoccurring or common among schemas, rather than discriminative concepts, which are concepts that distinguish one schema from another.

A reuse-based system utilises knowledge stored in a repository to identify correspondences between elements of two meta-models. A fundamental problem of reused-based approaches is creation of the knowledge repository. Current approaches propose a manual way by adding common concepts and their mappings to a repository. Besides being error-prone and tedious, this is no option in large-scale scenarios where many different and partially domain-specific concepts occur.

This disclosure provides an automatic graph-based approach for creating a repository of commonly used concepts, which enables automatic reuse-based meta-model matching systems. This disclosure is technical space independent, and the disclosure finds application in the domains of schema matching, ontology matching, metamodel matching, for example.

FIG. 1 represents an overview of an example system 10 according to the disclosure, component of which will be further described below. System 10 can be divided into a set of preparation modules 12, which operate to extract concepts from training schemas, and a runtime 13 that uses a repository of stored concept descriptions (can be represented by data in a schema format). A principal focus of this disclosure relates to the preparation modules 12, but an example of runtime 13 usage of outputs generated from preparation modules 12 is provided for context and as example applied usage of preparation modules 12.

A concept identification module 21 accepts a set of existing process descriptions, schemas, or data models as input. In this example, schemas descriptive of data models are used. As such, schemas 17 and 19 are representative of a potentially large number of schemas to be inputted to concept identification module 21.

A concept selection module 23 receives outputs from concept identification module 21. Concept selection module 23 can select a set of concepts outputted from concept identification module 21 according to a relevancy metric, in one example. A concept repository 25 receives concepts outputted from concept selection module 23. These concepts are represented by concepts 29-31. With respect to input schemas 17 and 19 and concepts 29-31, these are representative of an arbitrary number of input schemas and stored concepts, respectively. System 10 may be run any number of times in order to process new schemas provided to concept identification module 21. For example, concepts stored in concept repository 25 can be populated over time, and there is no implication that concept repository 25 cannot be updated or changed after initially populating concept repository 25.

In an example, matching 13 performs a reuse matching process 27, and in one particular example, a schema covering process is applied by reuse matching process 27. In one application, a source schema 35 is mapped to a target schema 37 by a schema covering process that is graphically depicted as involving finding a respective covering for each of source 35 and target 37 comprising a set of concepts from concept repository 25. As used here, concepts are used as a convenient way to differentiate inputs to system 10, from contents of repository 25, even though repository 25 may itself be populated with schemas (representing the identified and selected concepts). For sake of illustration, a concept 39 used in a covering of source schema 35 is identified in an output list 40 of concepts ultimately used in the covering for the source 35 and target 37 schemas.

As described before, commonly used concepts can be seen as design patterns. These design patterns represent common solutions of common problems. These patterns often have characteristic structures because otherwise, the patterns would be trivial and therefore relatively easy to address. As an example, if two models describe the same problem domain, one can assume that similar design problems occur in both models and therefore similar design patterns may have been used. The foregoing describes heuristic rationale for the inventive aspects disclosed. However, this disclosure primarily relates to automated concept extraction, and so providing models in a similar problem domain is not a prerequisite or a required input to systems according to the disclosure. In fact, dissimilar problem domains may also have similar conceptual underpinnings, and the approach disclosed herein may discover such concepts as frequently occurring, and useful in forming a basis of concepts for reuse.

FIG. 2 depicts an overall process that can be employed in system 10, and involves a process 50 of preparing concept repository 25 (concept extraction) and a process of schema matching/transformation 59. System 10 can perform preparation process 50 and matching/transformation 59 process independently. Output of process 50 also can be used as a repository of data for other systems and processes, and schema matching process 59 is an example application, rather than a limitation of use for such repository 25.

Concept extraction process 50 includes a preparation 51 process, a mining 53 process and a filtering 55 process (optional, as described below), examples of each treated in detail below.

FIG. 3 depicts an example preparation process 51. In an example, preparation process 51 operates on received schemas (e.g., schemas 17 and 19) and at 75, transforms elements and attributes of received schemas into a labeled graph. Vertices of each graph correspond to elements and attributes, while relations among elements and attributes are represented as edges in the graph. At 77, types for vertices and edges in the graph are determined FIG. 4 depicts an example process of determining a type (typing process 78) for each vertex and edge. The type is represented by an enumerated type identifier t (e.g., class and attribute), and a similarity class identifier, s as tupel (t,s).

With respect to FIG. 4, at 79, elements of the graphs are sorted by element type (e.g., class or attribute), and groups of each are created. At 81, the groups as split into similarity classes. In one example, name similarity is a basis for forming similarity classes. Name similarity can be pursued on a pair-wise basis for elements initially assigned to a given group according to type. For example, a pair of elements $(e_i, e_j)$ are assigned (82) to the same similarity class if $sim(e_i, e_j) > t$, where t is a threshold. The assignment to a class can be conditioned by a threshold. The threshold is designed to cause classes to be relatively small, so that if elements are fairly similar, e.g., their names are fairly similar, then a threshold for similarity can be adjusted higher so that classes remain relatively small, allowing a diverse population and so that usefulness of the classification as a discriminator among the elements is maintained.

Having calculated the similarity for a given element (e.g., $e_i$) the assignment is repeated, but is conditioned, at 87, by an error calculation. For example, the similarity of $(e_j, e_x)$ is calculated and multiplied with a similarity of the pair in question. As such, in the example, the following condition has to hold: $sim(e_i, e_j) * sim(e_j, e_x) > t$. In an example, a calculation can give a similarity score between two elements between 0 and 1. In additional to similarity of name, other aspects to determine or measure similarity of elements can include location within a hierarchy of elements (e.g., names of nearby elements can be judged for similarity). Directionality of such similarity can be considered, for example, similarity of parent or child elements can be specifically considered.

This similarity approach is an example of additional information that can be included about elements in the graph representation of the schema (and in relation to other schemas which are being used as inputs to building the concept repository). For example, using such a combined type provides for use of additional knowledge about elements. For example, by using a combination of type and similarity class, similar elements can be matched allowing lexical inexact pattern mining. More broadly, in order for the graph mining step to take full advantage of information contained in schemas, pre-processing thus embeds information derived from the schema in the graph. The similarity class approach is an example of such embedding. Other approaches to such embedding can be provided according to the disclosure.

Relevant and non-trivial patterns are selected and stored (FIG. 3, 57) in the concept repository for later use. In one example approach, graph mining is used to identify relevant and non-trivial patterns. Graph mining concerns the challenge of finding patterns in multiple given graphs. Here, graph mining is applied to extracting patterns (subgraphs) that are frequent (according to a selected metric or determination process) and closed in the set of input schema (schema 17, 19). As such, frequent and closed graphs are considered relevant and non-trivial to identify patterns occurring among training or input schema.

Figure 5:
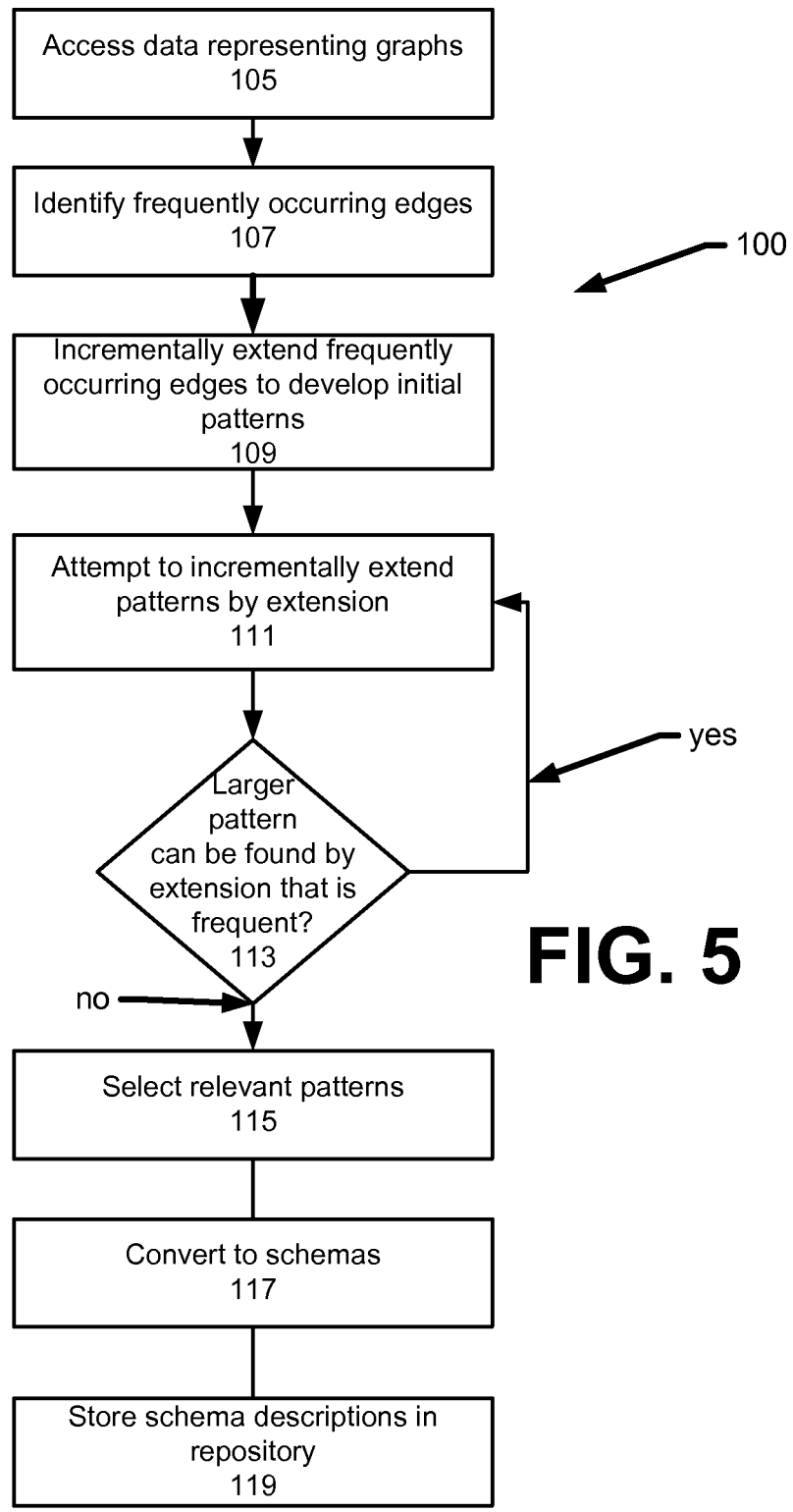
FIG. 5 represents an overview of a graph mining process in which closed subgraphs that have frequent support from a set of inputted graphs that were converted from schema are mined.

FIG. 5 depicts an example process for mining subgraphs that serve as descriptions of concepts stored in concept repository 25, to be available as a knowledge repository for reuse matching approaches, by which common concepts in the schemas to be matched are found, and mappings created using these findings.

For identifying design patterns in the input set of schema, a graph mining algorithm can be used. For example, a closed graph mining approach can be used. A subgraph (pattern) is closed if there is no larger subgraph (pattern) with the same occurrences in the inputted graphs. An approach to such closed graph mining is modeled on CloseGraph (see "CloseGraph: Mining Closed Frequent Graph Patterns. *Proc. of Int. Conf. on Knowledge Discovery and Data Mining* by Yan, X. (2003)), which extended gSpan (gSpan: Graph-Based Substructure Pattern Mining *Proc. of International Conference on Data Mining* Yan, X. (2002)).

By way of overview, for mining closed graphs, initially, all input graphs (graphs created based on input schema) are scanned for frequent occurrences of types, e.g., edges, which occur in multiple graphs. From a set of frequent edges, incremental extension is performed. Then, from given design patterns, further extensions are made until each pattern becomes infrequent (as determined by a thresholding condition). By way of explanation, as a pattern becomes larger, a number of graphs containing this pattern is decreasing with growing pattern size. If the number falls below a threshold, an entire sub tree of possible following extensions of that subgraph (pattern) can be discarded, because a number of supporting graphs (i.e., graphs with that larger pattern) cannot increase by adding edges.

With respect to exemplary process 100 in FIG. 5, at 105, data representing graphs converted from schemas 17-19 are accessed. At 107, frequently occurring edges are identified and at 109, incrementally extended to develop patterns. At 111, using the patterns, incremental extension is attempted, and a support/frequency of occurrence check is conducted at 113, in order to determine if a given possible extension reduces support of that extension in the graphs below a threshold. If not, then further extension is attempted, and if so, then extension is ceased. In one example, a minimum support required is at least two input schemas have the graph pattern. If only a single input schema has a given pattern, then the extension is not permitted.

Stated otherwise, possible extensions of the pattern in the graphs are calculated. It is checked if this extension is possible in the occurrences of this pattern in multiple other graphs. If possible, the pattern will be extended, i.e. an edge will be added to the pattern and all the occurrences allowing this extension. If this extension can be found in every occurrence of a pattern, only this extension will be taken into account at this stage, because other extensions will be made later on. The extension of the current pattern is repeated until there is no graph that has at least two supporting occurrence left. As such, in some examples, a specified minimum support for a pattern is that at least two input graphs contain the pattern; another example specified minimum support is that exactly two input graphs contain the pattern.

For simplicity, this discussion focuses determining one concept, even though a parallel processing implementation may be performing this method concurrently.

At 115, resulting patterns can be filtered based on their relevance. The relevance of a given pattern p can calculated by $r(p)=|p|^{\alpha} \cdot f^{\beta}$, where $|p|$ is the size of a pattern and f is the number of occurrences of p. The parameters $\alpha$ and $\beta$ determine the importance of the size and frequency of a pattern, respectively. For example, if $\beta$ is negative, the frequency f has to be small for higher relevance. In one example, if a number of schemas used as input is fairly small, then weight can be given to require bigger patterns. Where a schema covering approach is used, such filtering can be skipped, in that the schema covering approach functions as a filtering mechanism during operation.

The result of the extraction is a set of patterns that are characteristic patterns occurring in multiple input schemas and represent common concepts in those schemas. At 117, patterns can be transformed into a respective schema representations and at 119, these schema are saved in concept repository 25.

Consequently, the concepts discovered can be used for reuse-based matching. According to the disclosure, if a characteristic pattern is discovered in a source and target model, then matching approaches can deduce mappings between participating elements of the source and target models.

Figure 6:
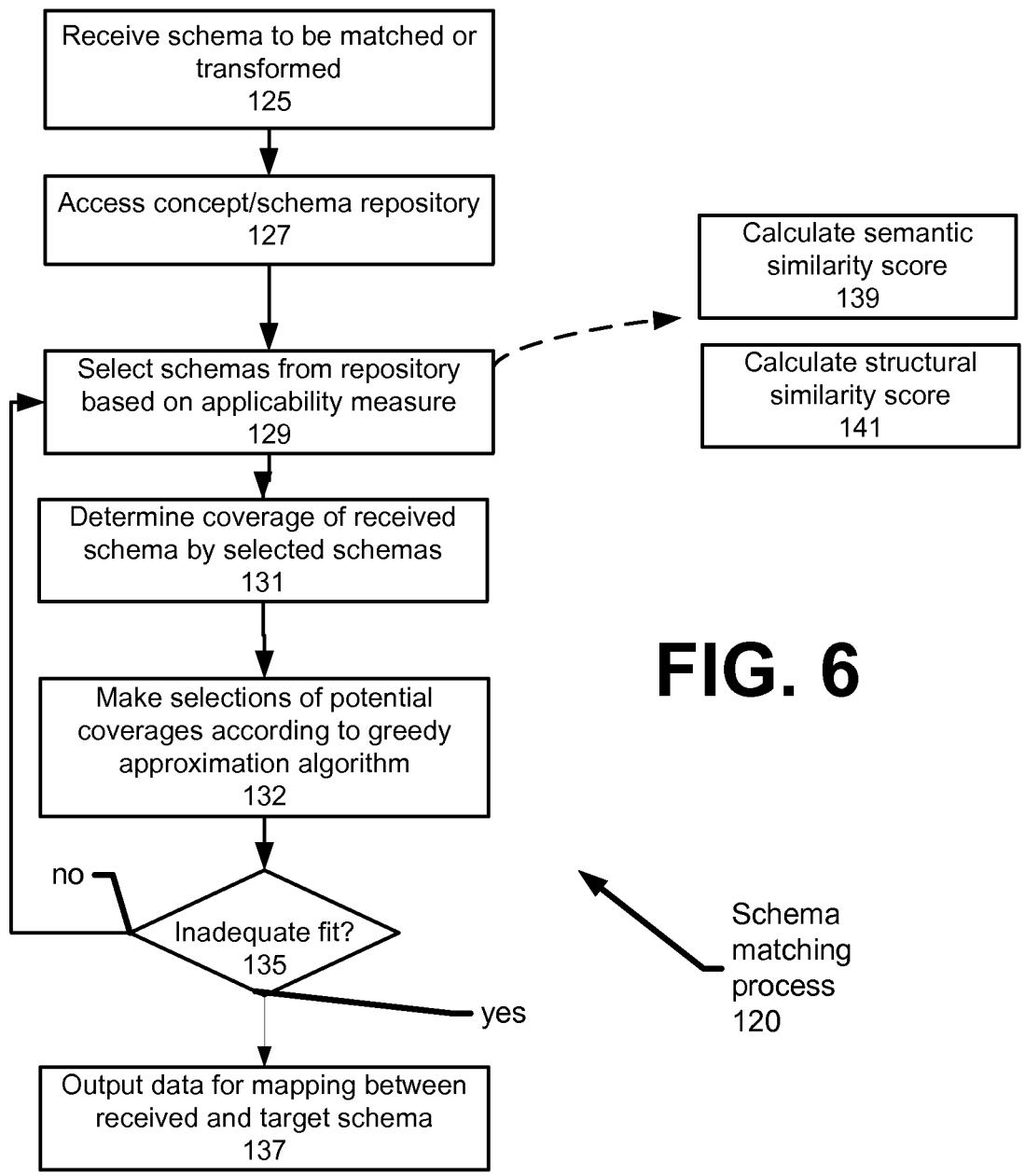
FIG. 6 depicts an overview of a schema covering approach that uses a concept repository populated according to the disclosure.

FIG. 6 provides an overview of a reuse-based matching system in which concepts and optional mappings between the concepts of a concept repository are used to produce mappings between two input schemas. Such system is generally in accordance with the schema covering approaches of "Schema Covering: a Step Towards Enabling Reuse in Information Integration" *Proc. of Data Engineering (ICDE)* pp. 285-296, Saha, B. (2010). As such, schema covering serves as an example system that can use a concept repository formed according to implementations of processes and systems disclosed above.

With respect to FIG. 6, schema matching process 120 includes, at 125, schema to be matched/transformed are received. At 127, stored schema are accessed from repository 25. At 129, schema are selected from according to their applicability to the received schema. Applicability can be determined by a combined measure of semantic and a structural similarity. A semantic similarity score is calculated (139), which represents a measure for potential matches based on the names of elements. A structural similarity score based on path length and neighbour relations is calculated (141) to filter out scattered concepts.

After selecting relevant concepts, at 131, schema covering computes the coverage of the concepts in the received schema. Those coverages are subgraphs spanned by elements, similar to the ones in the concepts, and additional elements in-between. Because of the NP-completeness of this problem, a greedy approximate algorithm is employed (132). At 135, termination of the coverage approach can be conditioned on a fit adequacy determination. At 137, mappings between coverages in source and target model are calculated.

FIG. 7 depicts hardware of machines configured to perform processes according to this disclosure. An example computer system 210 is illustrated in FIG. 7. Computer system 210 includes a bus 205 or other communication mechanism for communicating information, and a processor 201 coupled with bus 205 for processing information. Computer system 210 also includes a memory 202 coupled to bus 205 for storing information and instructions to be executed by processor 201, including information and instructions for performing the techniques described above, for example. This memory may also be used for storing variables or other intermediate information during execution of instructions to be executed by processor 201. Possible implementations of this memory may be, but are not limited to, random access memory (RAM), read only memory (ROM), or both. A storage device 203 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 203 may include source code, binary code, or software files for performing the techniques above, for example. Storage device and memory are both examples of computer readable mediums.

Computer system 210 may be coupled via bus 205 to a display 212, such as a cathode ray tube (CRT) or liquid crystal display (LCD), for displaying information to a computer user. An input device 211 such as a keyboard and/or mouse is coupled to bus 205 for communicating information and command selections from the user to processor 201. The combination of these components allows the user to communicate with the system. In some systems, bus 205 may be divided into multiple specialized buses.

Computer system 210 also includes a network interface 204 coupled with bus 205. Network interface 204 may provide two-way data communication between computer system 210 and the local network 220. The network interface 204 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 204 sends and receives electrical, electromagnetic, or optical signals that carry digital data streams representing various types of information.

Computer system 210 can send and receive information, including messages or other interface actions, through the network interface 204 across a local network 220, an Intranet, or the Internet 230. For a local network, computer system 210 may communicate with a plurality of other computer machines, such as server 215 one or more of which may run backend system software such as an ERP software system, CRM, or a database for example. Accordingly, computer system 210 and server computer systems represented by server 215 may form a local network, which may be programmed with processes described herein. In the Internet example, software components or services executing on computer system in the local network may communicate with computer programs on a cloud network 299 across the Internet. Communications with programs or services on the Internet may include communication with programs residing on multiple different computer systems 210 or servers 231-235 across the network. The processes described above may be implemented for communication with programs implemented on one or more servers, for example. A server 235 on cloud 299, for example, may transmit messages through Internet 230, local network 220, and network interface 204 to a component on computer system 210. The software components and processes described above may be implemented on any computer system and send and/or receive information between networks as set forth above, for example.

The apparatuses, methods, and techniques described below may be implemented as computer programs (software) executing on one or more computers. The computer program may further be stored on a computer readable medium, such as a tangible computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Based on the above disclosure and the following claims, other arrangements, embodiments, implementations and equivalents will be evident to those skilled in the art and may be employed without departing from the scope defined by the claims.

What is claimed is:

1. A machine implemented method of generating data describing concepts from data describing schema, comprising:
   accepting data describing a plurality of schema;
   deriving a respective graph representation of each schema in the plurality of schema to form data describing a set of graphs;
   mining the set of graphs to determine a set of closed subgraphs that appear in the set of graphs with a specified minimum support, wherein the mining of the set of graphs comprises initially identifying a pattern occurring in multiple graphs of the set of graphs and repeatedly enlarging the pattern by adding edges found in the set of graphs to the pattern to make the pattern larger until a number of graphs in the plurality of graphs that would remain after adding another component to the pattern falls below a threshold; and
   storing data representing at least some of the closed subgraphs on a tangible computer readable medium.

2. The method of claim 1, further comprising assigning a similarity class to each element of the set of graphs and using the similarity class in the mining of the set of graphs to perform lexically inexact pattern matching during the mining.

3. The method of claim 2, wherein respective similarity classes for the vertices are determined according to pairwise comparison of name similarity of the vertices, and grouping vertices having name similarity greater than a threshold.

4. The method of claim 1, further comprising converting the subgraphs to respective schema representations and wherein the storing data representing at least some of the closed subgraphs comprises storing the schema representations for those closed subgraphs.

5. The method of claim 1, further comprising specifying the minimum support threshold as being at least two graphs of the set of graphs.

6. The method of claim 1, further comprising filtering the set of subgraphs resulting from the mining according to a relevancy metric calculated for each of the subgraphs of the set, the relevancy metric determined by a formula according to relevance=$|p|\alpha \cdot |f|\beta$, where $|p|$ is a size of that subgraph, and $|f|$ is a frequency of appearance of that subgraph in the set of graphs, where $\alpha$ and $\beta$ are selected to determine a relative priority of frequency of appearance and size of subgraphs.

7. The method of claim 1, further comprising receiving a source schema and a target schema, and performing schema covering on the source schema and the target schema, using the stored schemas converted from the subgraphs.

8. A system for generating data describing concepts from data describing schema, comprising:
a processor capable of being configured using machine readable instructions;
a tangible machine readable medium, operatively coupled to the processor, and on which is stored instructions for configuring the processor, the instructions for causing the processor to perform a method comprising:
accepting data describing a plurality of schema;
deriving a respective graph representation of each schema in the plurality of schema to form data describing a set of graphs;
mining the set of graphs to determine a set of closed subgraphs that appear in the set of graphs with a specified minimum support, wherein the mining of the set of graphs comprises initially identifying a pattern occurring in multiple graphs of the set of graphs and repeatedly enlarging the pattern by adding edges found in to the pattern to make the pattern larger until a number of graphs in the plurality of graphs that would remain after adding another component to the pattern falls below a threshold;
converting at least some of the subgraphs to respective schema representations; and
storing data representing the schemas created from the converted subgraphs.

9. The system for generating data describing concepts from data describing schema of claim 8, wherein the instructions stored on the machine readable medium further comprise instructions for setting the minimum support as two or more graphs of the set of graphs.

10. The system for generating data describing concepts from data describing schema of claim 8, wherein the deriving of the respective graph representations further comprises determining a respective type and a respective similarity class for each vertice of the graph representations, and using the type and similarity class during mining of the set of graphs.

11. The system for generating data describing concepts from data describing schema of claim 10, wherein the similarity class of each vertex is determined according to a type of data represented by the vertex and a pairwise comparison of name similarity of the vertexes in the similarity class, the pairwise comparison the name similarity conditioned on the similarity being greater than a threshold.

12. The system for generating data describing concepts from data describing schema of claim 8, further comprising filtering the set of subgraphs resulting from the mining according to a relevancy metric calculated for each of the subgraphs of the set.

13. The system for generating data describing concepts from data describing schema of claim 12, wherein the relevancy metric comprises calculating the relevancy of each subgraph by a formula according to relevance=$|p|\alpha \cdot |f|\beta$, where $|p|$ is a size of each subgraph, and $|f|$ is a frequency of appearance of that subgraph in the set of graphs, where $\alpha$ and $\beta$ are selected to determine a relative priority of frequency of appearance and size of subgraph.

14. A tangible machine readable memory storing machine readable instructions for configuring a machine to perform a method comprising:
accepting data describing a plurality of schema;
deriving a respective graph representation of each schema in the plurality of schema to form data describing a set of graphs;
mining the set of graphs to determine a set of closed subgraphs that appear in the set of graphs with a specified minimum support, wherein the mining of the set of graphs comprises initially identifying a pattern occurring in multiple graphs of the set of graphs and repeatedly enlarging the pattern by adding edges found in multiple graphs of the set to the pattern to make the pattern larger until a number of graphs in the plurality of graphs that would remain after adding another component to the pattern falls below a threshold;
converting at least some of the subgraphs to respective schema representations; and
storing data representing the schemas created from the converted subgraphs on a tangible computer readable medium.

15. The tangible machine readable memory of claim 14, wherein the method further comprises assigning a similarity class to each element of the set of graphs and using the similarity class in the mining of the set of graphs to perform lexically inexact pattern matching during the mining.

16. The tangible machine readable memory of claim 15, wherein the similarity class of each vertex is determined according to a type of data represented by the vertex, and a pairwise comparison of name similarity of the vertexes in the similarity class, wherein the pairwise comparison the name similarity is conditioned on the similarity being greater than a threshold.

17. The tangible machine readable memory of claim 14, wherein the method further comprises filtering the set of subgraphs resulting from the mining according to a relevancy metric calculated for each of the subgraphs of the set, the relevancy metric determined by a formula according to relevance=$|p|\alpha \cdot |f|\beta$, where $|p|$ is a size of that subgraph, and $|f|$ is a frequency of appearance of that subgraph in the set of graphs, where $\alpha$ and $\beta$ are selected to determine a relative priority of frequency of appearance and size of subgraphs.

* * * * *